June 21, 1932.  J. D. SMALL  1,864,259
REFRIGERATOR CAR AND DETACHABLE UNIT THEREFOR
Filed Feb. 21, 1929
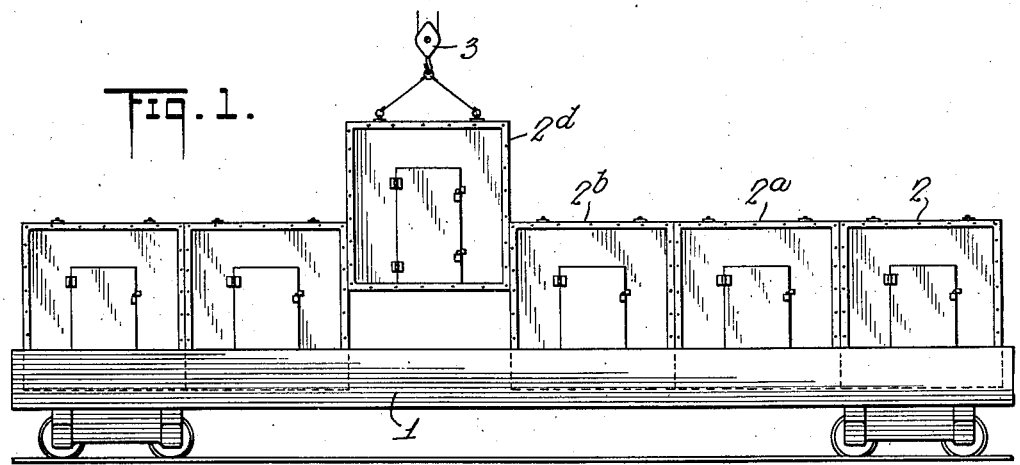
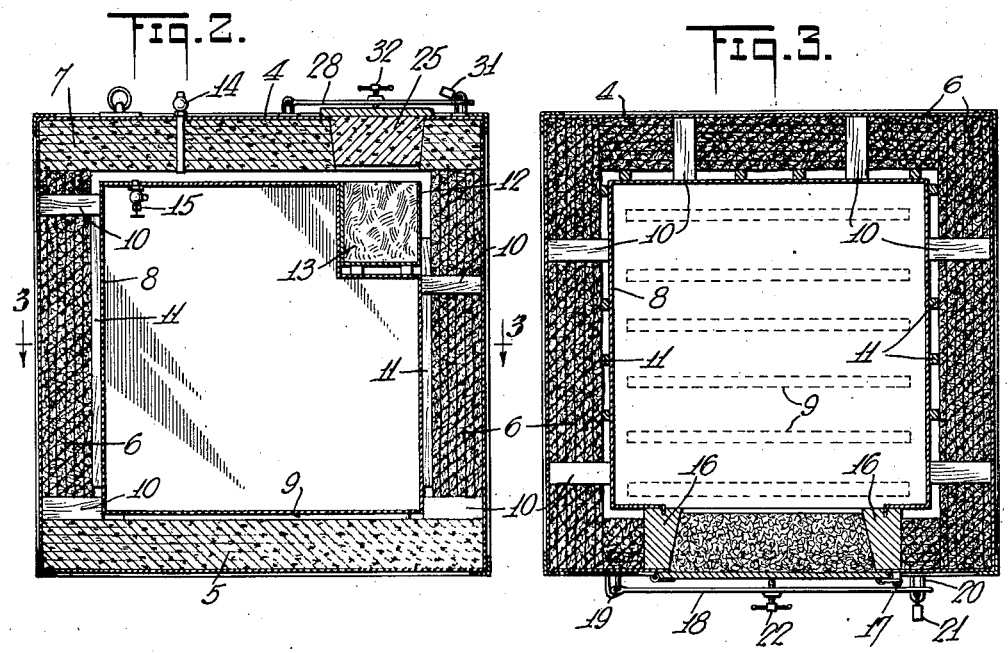
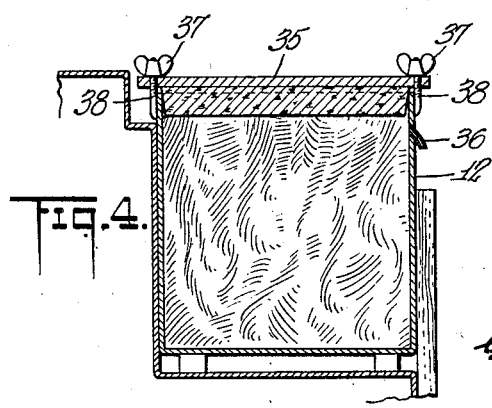
INVENTOR
John D. Small
BY
ATTORNEY Patented June 21, 1932

1,864,259

UNITED STATES PATENT OFFICE

JOHN D. SMALL, OF NEW YORK, N. Y., ASSIGNOR TO DRYICE EQUIPMENT CORPORATION, OF NEW YORK, N. Y., A CORPORATION OF DELAWARE

REFRIGERATOR CAR AND DETACHABLE UNIT THEREFOR

Application filed February 21, 1929. Serial No. 341,704.

My present invention relates to long distance transportation of perishable products and is particularly applicable to products which are not damaged by overfreezing, as for instance, meat, fish, vegetables, fruit, ice cream, water ice, Eskimo pie, etc., and involves the solution of certain problems peculiarly involved in the use of frozen carbon dioxide as a refrigerant medium.

Heretofore methods have been proposed for shipments of perishable products refrigerated by frozen carbon dioxide wherein the refrigerant, suitably insulated, is packed in with packages or parcels of said products, but no scientific or orderly use of the carbon dioxide gas given off by the sublimating solid carbon dioxide has ever been made because the shipping containers have not been of a type suitable for the purpose. In many cases they are simply corrugated paper cartons intended to be thrown away by the customer. In other cases, balsa wood boxes have been proposed. But recent test has shown that even balsa wood boxes are astonishingly permeable for escape of carbon dioxide gas, so much so that unless extravagant amounts of carbon dioxide ice are used to give a high gas generating rate, the volumes of gas are not sufficient to exclude air from the containers. Furthermore, all but a very few of the usable materials are likewise phenomenally permeable to the gas. So much is this true, that the cheapest and safest reliance has been found to be a metal container. The metal is absolutely impervious and it can be built absolutely gas tight, as by brazing or preferably by welding all seams. For throw away purposes, however, the cost of such containers is prohibitive and the metal is objectionable because it is the best possible conductor of heat.

However, I have discovered that it is possible to make these metal containers of large size and great structural strength for wholesale shipments, and by lining them with sufficient non-conducting material and installing therein a circulatory system affording what may be termed dynamic or convection insulation by proper circulation of the gas from the frozen carbon dioxide, the latter, though relatively costly per pound, may be economically employed.

One difficulty in connection with proper circulation of the gas to insulate an inner chamber containing the perishable products, is the important role which gravity, that is the weight of the gas, plays in maintaining a proper circulation; but by my invention this is taken care of by constructing the container so that it is practically impossible to use it or ship it except right side up as regards gravity-thermo-circulation of the gas. Furthermore, by this expedient it is practicable to provide in the top of the container a separate opening or manhole through which the frozen carbon dioxide may be replenished from time to time.

In accordance with the complete system which my invention contemplates, the container units may be packed with perishable products and the bunkers charged with solid carbon dioxide at the place of shipment, picked up by suitable hoisting mechanism, deposited on trucks, transferred by suitable hoisting mechanism to platform or gondola cars, shipped to destination, replenished with solid carbon dioxide on the way if necessary, again transferred to trucks, carried to the place of distribution, and deposited right side up for use like an ordinary dispensing refrigerator until the products contained therein are disposed of. Even though the container must then be returned to the shipper, the relatively enormous quantities of perishable products that can be shipped in a single container will far more than compensate for the cheapness of the throw away containers, or the balsa wood boxes heretofore used.

The above and other features of my invention will be more evident from the following description in connection with the accompanying drawing, in which Fig. 1 is a conventional view indicating a carload of my right-side-up containers deposited on an ordinary freight-car which may be of the platform or the gondola type;

Fig. 2 is a characteristic vertical section through one of the shipping units on a plane parallel with the elevation shown in Fig. 1; and Fig. 3 is a horizontal section on the line 3—3, Fig. 2.

Fig. 4 is a view like Fig. 2, showing a modified detail therefor.

As somewhat diagrammatically indicated in Fig. 1, a railway refrigerator car constituted in accordance with my present invention may comprise an ordinary platform or gondola freight car 1, having fitted thereon a superstructure comprising sectional refrigerator units 2, 2a, 2b, etc. As indicated for the section or unit 2d, they are all removable and are of the size, weight and construction that would be normally handled by hoisting tackle as at 3 and as a practical matter would at all times be kept right side up.

While my invention is not limited to exact sizes or weights for the units, large size is important for many reasons. For instance, in the present case, the units occupy the full width of the car and are approximately 7-foot cubes. With such units, the walls and circulatory spaces may be approximately one foot thick, yet the net refrigerated space for shipment of the goods will be 625 cubic feet for an exposed heat absorbing surface of approximately 300 square feet. This is in remarkable contrast to the balsa wood shipping box referred to above which may be, say, 2 ft. x 2 ft. x 3 ft. and with insulating walls only 3 inches thick will afford only about 5 cubic feet of storage space for 32 square feet of exterior heat absorbing area, so that other things being equal, the amount of refrigerant per unit storage space would be something like 5 times as much for the balsa wood box as for my refrigerator car unit.

Each unit comprises a strong rigid exterior casing 4, preferably made from rolled steel plates riveted together and stayed with angle irons for all edges. Stiffness may be insured by truss-like ribs either rolled in the plates or applied in the form of stay-strips or channel irons. A very important feature of this casing is that all exterior seams are rendered absolutely gas tight, preferably by brasing or "strip welding", although certain grades of asphaltum, paraffin and the like might be used, if properly applied and protected.

The casing being of such good heat absorbing material and the exposure in regular use being frequently great is compensated for in two ways: First, there is very heavy interior insulating lining of cork, kapok or the like. In the present case, the floor 5 is protected by, say, 10 inches of cork while the side walls are protected by similar thicknesses of compressed kapok blankets 6. The roof insulation 7 may be either kapok or cork, but for structural integrity I have elected to indicate cork.

As before indicated, a very important feature of the invention is refrigeration of the interior by means of solid carbon dioxide arranged to have a circulatory system for the gas evolved so as to afford what may be termed live or dynamic insulation in addition to the cork or kapok insulation previously described. As has been proposed sometime since and is now well known, such systems preferably utilize a solid carbon dioxide container at a high level and the circulation of the gas is by gravity, the cold gas flowing downward from the source, across under the bottom and, as it becomes warm and of lighter specific gravity, it rises to the top where it may escape to the outer air, thus operating by convection to carry to the outer air large amounts of sensible heat that leak in through the insulating walls.

In the illustrative form shown in the drawing, the refrigerated cargo space is in the interior of a preferably gas tight sheet metal chamber 8 supported above the cargo floor 5 on cleats 9, laterally stayed by blocks 10 of non-conducting materials such as balsa wood. To further insure circulating space between the kapok walls 6 and said inner container, vertical strips 11 may be interposed.

Rigidly secured in the uppermost part of the inner container is a bunker 12 for the solid carbon dioxide 13. Heat finding its way to this bunker causes sublimation of the solid carbon dioxide evolving large volumes of gas, approximately 500 cubic feet of gas for one cubic foot of the solid. This gas spills out and being very heavy flows by gravity down the interspace between slats 11, across the bottom between slats 9 and up the other side between slats 11 to the space above the top of the inner container. From this warmest part of the circulatory space, the gas is permitted to escape as for instance through the outlet check valve 14. If the cargo is of a kind warranting it, insulating carbon dioxide gas may be admitted to the interior through a hand operated cock 15.

The inner container is preferably seamless and the free edges of the sheet metal are preferably embedded in doorway frame members 16, 16, as shown in Fig. 3, the joint being made absolutely gas-tight by liberal application of asphalt preparation. The same asphalt preparation is preferably used at the joint between this door frame and the outer shell 4.

Though not shown in detail, the service door for loading and unloading the cargo is constructed with greatest care to have it close gas-tight, not because of the internal gas pressure, which is preferably not excessive, but because of the phenomenal diffusive ability of the carbon dioxide gas whereby it will find its way out of the low level leaks to draw in air at high level leaks even when the gas is being supplied at what one would consider a very high rate. The door is formed with an inner lining of firm, highly compressed insulating material, preferably in wedge form, and tightly fitting so that a very tight joint will be formed when the door is closed. Ordinary wedge latches 17, such as commonly employed for refrigerator doors, may be used and in addition, for my present purposes, I prefer to provide a clamping bar 18 swinging on a staple 19 and having its free end adapted to engage another staple 20 over which it may be secured by a padlock or by a seal diagrammatically indicated at 21. This clamping bar may be provided with means for exerting special pressure on the door to force it home as, for instance, the clamping screw 22.

My shipping container differs from other transportation packages in the further particular that it has a separate, always accessible, opening for replenishing the bunkers with solid carbon dioxide whether in transit or at the place of distribution of the product. This is afforded by a roof opening with a wedge plug closure 25 of insulating material. Protection of the merchandise being shipped does not require that this closure be locked, but I preferably provide a locking bar 28 with clamping screw 32 adapted to be held in position by lock or seal 31 which may be similar to parts 18, 22 and 21 of Fig. 3.

It will be understood that the above circulatory refrigerating system is intended to be illustrative of any system in which the gravity flow of the carbon dioxide gas from the refrigerant figures as an important factor in effective insulation of the package. Other such systems may be employed and if desired, particularly where kapok blankets are used for the walls, the solid carbon dioxide bunker 12 may be closed as shown in Fig. 4, by a tight fitting cover 35 so as to confine the carbon dioxide gas for the purpose and with the result that it may be released at relatively high velocity through a constricted outlet 36 discharging in a direction to accelerate the natural circulation and break up the tendency to stagnation of the extremely cold gas in the bottom of the package. The cover may be held down by its own weight where only slight pressures are desired or clamping nuts 37 on studs 38 may be provided to withstand any required degree of internal pressure that may be desired for giving suitable volume and velocity to the jet through 36.

It will be noted that in Fig. 1 I have shown the service doors of the transportation package as outwardly presented, but it will be obvious that the doors may be faced against each other with only the imperforate side walls exposed.

While the specific circulatory system for the gas herein shown is a good one, it will be understood that almost any circulatory system for cold $CO_2$ gas, that depends on the direction of gravity for its best functioning, could be used for the units of my right-side-up transportation and dispensing system.

The means and structure practically compelling such right-side-up transportation and operation may be supplemented or substituted as by bulging, crowning or otherwise configuring the roof and, if desired, the upright walls. External projections, ribs or channel irons or bosses could be used for this purpose as well as for the ordinary purpose of protection and structural strength.

While I have referred to the transportation units as approximating cubical and have referred to specific dimensions, it will be evident that wide variation is possible. For instance, the car platform could be covered by rows of units having horizontal sections of, say 3½ feet by 7 feet or 3½ feet by 3½ feet and their heights may be greater or less than the horizontal dimensions. Moreover, for truck or for box car transportation of units to be used as dispensing refrigerators by customers, different sizes and small sizes would be usable provided the right-side-up construction is employed.

I claim:

1. A refrigerator car comprising an open or platform freight car having thereon a refrigerator structure comprising a single layer of removable, closely assembled refrigerator units all supported directly on the car platform and occupying substantially the whole load carrying area of the platform, said refrigerator units each extending approximately the full width of said platform and each being approximately cubical, each comprising a gas-tight outer casing of metal having thick inner walls of permeable insulating material enclosing an inner metal container arranged to afford gas circulating interspaces between said permeable insulating walls and said inner container, high level bunkers for solid carbon dioxide outside of said container and discharging gas at a high level for circulation in the interspace between said walls and said container; the upright walls of each being formed with service doors and locking means for the cargo, and its roof provided with an opening for charging the bunkers and with holding devices for hoisting tackle whereby in all transportation and uses it is made difficult to dispose the unit other than right side up.

2. A refrigerator car comprising an open or platform freight car having thereon a refrigerator structure comprising a single layer of removable, closely assembled refrigerator units all supported directly on the car platform and occupying substantially the whole load carrying area of the platform, said refrigerator units each comprising a gas-tight outer casing of metal having thick inner walls of permeable insulating material enclosing an inner metal container arranged to afford gas circulating interspaces between said permeable insulating walls and said inner container, high level bunkers for solid carbon dioxide outside of said container and discharging gas at a high level for circulation in the interspace between said walls and said container; the upright walls of each being formed with service doors and locking means for the cargo, and its roof provided with an opening for charging the bunkers and with holding devices for hoisting tackle whereby in all transportation and uses it is made difficult to dispose the unit other than right side up.

3. A refrigerator car comprising an open or platform freight car having thereon a refrigerator structure comprising a single layer of removable, closely assembled refrigerator units all supported directly on the car platform and occupying substantially the whole load carrying area of the platform, said refrigerator units each being approximately cubical and each comprising a gas-tight outer casing of metal having thick inner walls of permeable insulating material enclosing an inner metal container arranged to afford gas circulating interspaces between said permeable insulating walls and said inner container, high level bunkers for solid carbon dioxide outside of said container and discharging gas at a high level for circulation in the interspace between said walls and said container.

4. A refrigerator car comprising an open or platform freight car having thereon a refrigerator structure comprising a single layer of removable, closely assembled refrigerator units all supported directly on the car platform and occupying substantially the whole load carrying area of the platform, said refrigerator units each comprising a gas-tight outer casing of metal having thick inner walls of permeable insulating material enclosing an inner metal container arranged to afford gas circulating interspaces between said permeable insulating walls and said inner container, high level bunkers for solid carbon dioxide outside of said container and discharging gas at a high level for circulation in the interspace between said walls and said container, each being of great size and weight requiring hoisting tackle for lifting and provided with holding devices for the hoisting tackle arranged to facilitate hoisting and depositing right-side-up only.

5. As a new article of manufacture, a heat insulating container in which perishable goods are adapted to be shipped and from which the goods may be subsequently vended, the container comprising a strong portable box-like body the interior of which is adapted to be snugly packed with goods, said container having an opening therein through which the goods are adapted to be inserted and removed and means to secure the closure against unauthorized or undetected opening while in transit, said container wholly enclosing a chamber of very small capacity as compared to the capacity of the container and adapted to accommodate an intensely cold solid refrigerant of the sublimating type, and a closure controlled charging opening for said chamber independent of said first mentioned closure, in combination with means to permit the gas sublimating from the refrigerant to flow in heat exchanging relationship to the merchandise content of the container and means to prevent the creation of undesirable pressures in the container or the chamber by the gas which is generated, said container being of the massive flat sided type adapted to be snugly fitted between similar units on flat cars for transportation, and having its refrigerant charging opening in the top, and its goods loading opening in one of its vertical walls.

6. A refrigerated unit or package for transportation purposes, comprising a gas-tight outer casing of metal having thick inner walls of insulating material enclosing an inner container for the cargo, high level bunkers for solid carbon dioxide outside of said container and discharging gas at a high level for and arranged for gravity circulation thereof in operative relation to the cargo; the upright walls of each being formed with service doors and locking means for the cargo and its roof being provided with holding devices whereby in all transportation and uses it is made difficult to dispose the unit other than right-side-up.

7. A refrigerated unit or package for transportation purposes, said unit being of approximately rectangular horizontal section and of size adapted to substantially occupy the available width of the load bearing area of a platform freight car, said unit comprising a gas-tight outer casing, having thick inner walls of insulating material enclosing an inner container, said insulating material being permeable to permit gas circulation between the walls of the outer casing and the inner container, high level bunkers for solid carbon dioxide discharging gas for such circulation in said interspace, the upright walls of said unit being formed with service doors and locking means for the cargo and its roof being provided with openings for charging the bunkers without permitting access to the cargo.

8. A refrigerated unit or package for transportation purposes, comprising a gas-tight outer casing, having thick inner walls of insulating material enclosing an inner container, said insulating material being permeable to permit gas circulation between the walls of the outer casing and the inner container, high level bunkers for solid carbon dioxide discharging gas for such circulation in said interspace, the upright walls of said unit being formed with service doors and locking means for the cargo and its roof being provided with openings for charging the bunkers without permitting access to the cargo.

9. An interchangeable, less than carload lots refrigerator compartment having a gas-tight outer casing, a thick layer of permeable insulating material disposed against said outer casing and a gas-tight inner sheathing, having an interspace between it and said insulating material and means for circulating carbon dioxide gas in said interspace.

10. A refrigerator car comprising a multiplicity of large size refrigerative compartments, each having gas-tight exterior walls, a thick layer of permeable insulation in contact with said exterior walls and gas-tight interior walls spaced apart from said permeable insulating material, affording an interspace for free circulation of gas and enclosing a cargo space, a refrigerant container in the upper part of said interspace, solid carbon dioxide in said container and means for applying gas evolved from said container into said interspace and from said interspace into the cargo space, a door opening through the roof into said container for charging the same and another door opening into the cargo space within said container, whereby access may be had to any compartment without opening another compartment.

11. A refrigerator car as specified in claim 10 and in which the compartments are similar, independently removable and replaceable structures.

Signed at New York, in the county of New York and State of New York, this 16th day of February, A. D. 1929.

JOHN D. SMALL.